United States Patent
Plancon et al.

(10) Patent No.: US 12,403,796 B2
(45) Date of Patent: *Sep. 2, 2025

(54) SEAT TRACK

(71) Applicant: FAURECIA Sièges d'Automobile, Nanterre (FR)

(72) Inventors: Bertrand Plancon, Flers (FR); Fabrice Petit, St Georges des Groseillers (FR); Guillaume Petot, La Ferrière aux Etangs (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 560 days.

This patent is subject to a terminal disclaimer.

(21) Appl. No.: 17/568,992

(22) Filed: Jan. 5, 2022

(65) Prior Publication Data
US 2022/0212571 A1    Jul. 7, 2022

(30) Foreign Application Priority Data

Jan. 7, 2021   (FR) ..................................... 21 00124

(51) Int. Cl.
*B60N 2/07* (2006.01)
(52) U.S. Cl.
CPC .................................. *B60N 2/0722* (2013.01)
(58) Field of Classification Search
CPC ................ B60N 2/0272; B60N 2/0705; B60R 21/01554
See application file for complete search history.

(56) References Cited

U.S. PATENT DOCUMENTS

| | | | | |
|---|---|---|---|---|
| 5,296,768 A * | 3/1994 | Burger | ................... | H02K 23/66 310/68 B |
| 5,354,112 A * | 10/1994 | Hara | ...................... | B66C 1/101 294/81.5 |
| 6,053,529 A | 4/2000 | Frusti | | |
| 6,352,037 B1 * | 3/2002 | Doyle | ...................... | A47B 9/00 108/50.02 |
| 7,614,597 B2 | 11/2009 | Matsumoto | | |
| 8,814,122 B2 * | 8/2014 | Couasnon | ............ | B60N 2/0244 324/207.13 |
| 10,569,994 B2 * | 2/2020 | Kulak | ..................... | B66B 13/24 |

(Continued)

FOREIGN PATENT DOCUMENTS

FR   3070914 A1   3/2019

OTHER PUBLICATIONS

French Search Report for French App. No. FR2100124 dated Sep. 17, 2021, 8 pages, No English Translation Available.

*Primary Examiner* — Shin H Kim
(74) *Attorney, Agent, or Firm* — Barnes & Thornburg LLP

(57) ABSTRACT

A track for a vehicle seat comprising: a female rail; a male rail, mounted sliding relative to the female rail where the female rail comes to surround the male rail with a substantially flat wall of the female rail located across from a substantially flat wall of the male rail; a position sensor for the male rail relative to the female rail, received inside a case. The case is fixed to the male rail at least partially extending into the volume of the male rail, such that the position sensor is located across from the substantially flat wall of the female rail, after having been inserted and slid through at least one opening arranged in the substantially flat wall of the male rail.

17 Claims, 9 Drawing Sheets

(56) References Cited

U.S. PATENT DOCUMENTS

| | | | |
|---|---|---|---|
| 2004/0100388 A1* | 5/2004 | Yoshida | B60N 2/067 |
| | | | 701/45 |
| 2007/0069100 A1* | 3/2007 | Schuler | B60N 2/929 |
| | | | 248/430 |
| 2012/0018608 A1* | 1/2012 | Nishide | B60N 2/067 |
| | | | 248/429 |
| 2014/0142507 A1* | 5/2014 | Armes | A61M 5/20 |
| | | | 604/112 |
| 2022/0097570 A1* | 3/2022 | Petot | B60N 2/0272 |
| 2022/0097571 A1* | 3/2022 | Petit | B60N 2/0705 |
| 2022/0396177 A1* | 12/2022 | Jablonski | B60N 2/0722 |

* cited by examiner

SEAT TRACK

PRIORITY CLAIM

This application claims priority to French Patent Application No. FR2100124, filed Jan. 7, 2021, which is expressly incorporated by reference herein.

BACKGROUND

The present disclosure relates to a track, in particular for an automotive vehicle seat, to a manufacturing process for such a track, and to a vehicle seat comprising such a track.

More specifically, the disclosure relates to a track for a vehicle seat comprising a female rail and a male rail sliding relative to each other along a longitudinal direction of the track, where the female rail comes to surround the male rail along a transverse direction of the track.

SUMMARY

According to the present disclosure, a track for a vehicle seat comprises a female rail and a male rail mounted sliding relative to each other along a longitudinal direction of the track, where the female rail comes to surround the male rail along the transverse direction of the track, and with a position sensor configured for determining the position of the male rail relative to the female rail with simplified design, reduced dimensions, in particular along the transverse direction of the track, and reduced unit cost.

In illustrative embodiments, a slider in accordance with the present disclosure improves the safety for the occupants of the vehicle. In illustrative embodiments, a slider in accordance with the present disclosure is rapid and simple to manufacture.

In illustrative embodiments, a slider for a vehicle seat comprises:
- a female rail, having at least one substantially flat wall;
- a male rail, also having at least one substantially flat wall, mounted sliding relative to the female rail along the longitudinal direction of the track, where the female rail comes to surround the male rail along the transverse direction of the track, with the substantially flat wall of the female rail located across from the substantially flat wall of the male rail;
- a position sensor configured so as to determine the position of the male rail relative to the female rail, at least along the longitudinal direction of the track, where the position sensor is received inside a case.

In illustrative embodiments, the case is fixed to the male rail at least partially extending into the volume of the male rail, such that the position sensor is located across from the substantially flat wall of the female rail, after having been inserted and slid through an opening arranged in the substantially flat wall of the male rail.

In illustrative embodiments, the features disclosed in the following paragraphs may, optionally, be implemented. They may be implemented independently of each other or in combination with each other:

- the substantially flat wall of the male rail in which the opening is arranged is a first vertical lateral wall of the male rail, substantially extending along the longitudinal direction and along the vertical direction of the track, and in which the case is fixed to the male rail after having been inserted and slid through the opening substantially along the transverse direction of the track, where the male rail has a second vertical lateral wall, substantially parallel, and advantageously identical, to the first vertical lateral wall, and the substantially flat wall of the female rail across from which the position sensor is located is a vertical lateral wall of the female rail, which extends substantially along the longitudinal direction and along the vertical direction of the track, substantially parallel to the first vertical lateral wall and the second vertical lateral wall of the male rail, where the position sensor is located across from the vertical lateral wall of the female rail along the transverse direction of the track;
- the vertical lateral wall of the female rail across from which the position sensor is located is arranged facing, along the transverse direction of the track, and directly by the first vertical lateral wall of the male rail in which the opening is arranged, and opposite the second vertical lateral wall of the male rail, along the transverse direction of the track;
- the case and the opening are configured such that the position sensor extends, at least partially, through the opening;
- the case comprises an upper attachment part comprising an attachment system and a lower part for receiving the position sensor, positioned under the upper attachment part along the vertical direction of the track, receiving the position sensor on the inside, and the opening comprises an upper part configured for receiving the upper part for attaching the case through the upper part by sliding along the transverse direction of the track, and advantageously for preventing the sliding of the lower part of the case for receiving the position sensor through the upper part along the transverse direction of the track, where the attachment system for the upper part for attaching the case provides the attachment of the case to the first vertical lateral wall of the male rail near the upper part of the opening, and the opening comprises a lower part, positioned under the upper part of the opening along the vertical direction of the slider, and configured for receiving the lower part for receiving the position sensor of the case through the lower part of the opening by sliding along the transverse direction of the track;
- the lower part for receiving the position sensor is located joined against an inner surface of the vertical wall of the female rail along the transverse direction of the track, such that the position sensor is located closest to the vertical lateral wall of the female rail along the transverse direction of the case;
- the vertical lateral wall of the female rail across from which the position sensor is located is arranged facing, along the transverse direction of the track, and directly by the second vertical lateral wall of the male rail, and opposite the first vertical lateral wall of the male rail in which the opening is arranged, along the transverse direction of the track;
- the case comprises a first part for attaching the case comprising an attachment system and a second part for receiving the position sensor, positioned in the extension of the first upper attachment part along the transverse direction of the track, receiving the position sensor on the inside, where the attachment system of the first part for attaching the case provides the attachment of the case to the first vertical lateral wall of the male rail near the opening, and the opening is configured in order to receive the first attachment part and the second part for receiving the position sensor of the case through the opening by sliding along the transverse direction of the track;

the second part for receiving the position sensor is located bearing against an inner surface of the second vertical lateral wall of the male rail, such that the position sensor is located closest to the vertical lateral wall of the female rail along the transverse direction of the case;

the upper part, respectively the first part, for attaching the case comprises a receiving housing configured for receiving and holding in position a connection interface connected to one or more cables, in particular electrical, arranged for being connected to the position sensor, where the receiving housing extends substantially along the transverse direction of the track in the upper part, respectively the first part, for attaching the case, and has an opening end positioned near the opening arranged in the first vertical lateral wall of the male rail, where the receiving housing opens out towards the outside of the male wheel near the opening end of the receiving housing;

The attachment system comprises:

two attachment tabs secured with the upper part, respectively the first part, for attaching the case, positioned on either side of the opening end of the receiving housing along the longitudinal direction of the track, and coming to bear against an outer surface of the first vertical lateral wall of the male rail, on both sides of the opening, along the longitudinal direction of the track; and two counter-bearing surfaces, substantially flat, secured to the upper part, respectively the first part, for attaching the case, positioned on either side of the opening end of the receiving housing along the longitudinal direction of the track, and coming to bear against an inner surface of the first vertical lateral wall of the male rail, on either side of the opening, along the longitudinal direction of the track, and each positioned substantially across from an attachment tab along the transverse direction of the slider, such that the first vertical lateral wall of the male rail is sandwiched between each attachment tab/counter-bearing surface pair located across from each other along the transverse direction of the track;

The attachment system comprises:

two elastic connections each connecting one attachment tab to the upper part, respectively the first part, for attaching the case, each configured so as to allow the movement of each attachment tab relative to the housing for receiving the case generally along the longitudinal direction of the slider;

two elastic connections each connecting one counter-bearing surface to the upper part, respectively the first part, for attaching the case, each configured so as to allow the movement of each counter-bearing surface relative to the housing for receiving the case generally along the longitudinal direction of the track, such that each attachment tab, and possibly each counter-bearing surface, is located positioned, at least in part, inside the housing for receiving the case without extending beyond the opening arranged on the first vertical lateral wall of the male rail along the longitudinal direction of the track, in order to allow insertion and sliding of the case through the opening arranged in the first vertical lateral wall of the male rail along the transverse direction of the track, and then that each attachment tab and each counter-bearing surface may move, because of the elasticity of each elastic connection, relative to the upper part, respectively the first part, for attaching the case, generally along the longitudinal direction of the track in order to be deployed outside the housing for receiving the case and that the attachment tabs and the counter-bearing surfaces are positioned on either side of the opening end of the receiving housing along the longitudinal direction of the track, in order that the first lateral wall of the male track is sandwiched between each attachment tab/counter-bearing surface pair located facing along the transverse direction of the track with each attachment tab coming to bear against the outer surface of the first vertical lateral wall of the male rail and each counter-bearing surface coming to bear against the inner surface of the first vertical lateral wall of the male rail, in order to provide the attachment of the case to the male rail;

the case is made of a single unit, advantageously of plastic, such as for example polyoxymethylene (POM);

the case is attached to the male rail by extending completely in the volume of the female rail along the transverse direction of the track.

In illustrative embodiments, a manufacturing process for a track according to one of the embodiments of the disclosure comprises:

a) inserting the case for the position sensor through the opening arranged on the substantially flat wall of the male rail;

b) sliding the case relative to the male rail through the opening arranged on the substantially flat wall of the male rail such that the case extends at least partially into the volume of the male rail with the position sensor across from the substantially flat wall of the female rail;

c) attaching the case to the male rail.

In illustrative embodiments, during steps a) and b), each attachment tab and each counter-bearing surface is positioned, at least in part, inside the housing for receiving the case without extending beyond the opening arranged on the first vertical lateral wall of the male rail along the longitudinal direction of the track; and during step c), the attachment tabs and the counter-bearing walls are deployed outside of the housing for receiving the case such that the attachment tabs and the counter-bearing surfaces are positioned on either side of the opening end of the receiving housing along the longitudinal direction of the track, in order that the first vertical lateral wall of the male rail is sandwiched between each attachment tab/counter-bearing surface pair located across from it along the transverse direction of the track with each attachment tab coming to bear against the outer surface of the first vertical lateral wall of the male rail and each counter-bearing surface coming to rest against the inner surface of the first vertical lateral wall of the male rail, from both sides of the opening, along the longitudinal direction of the track, in order to provide the attachment of the case to the male rail.

In illustrative embodiments, a vehicle seat comprises a track according to one of the embodiments of the disclosure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 13A:
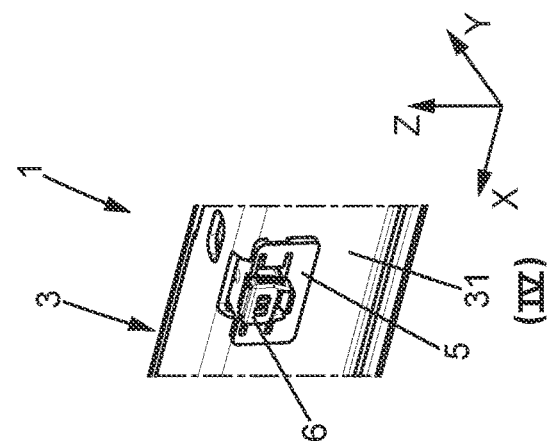
Figure 13A:
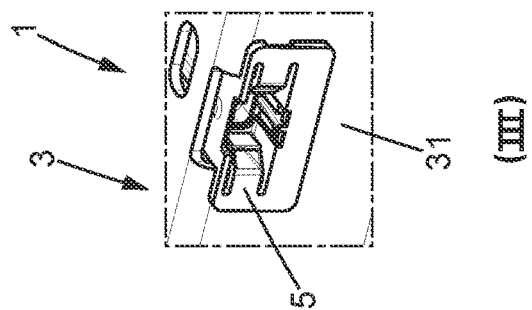
Figure 13A:
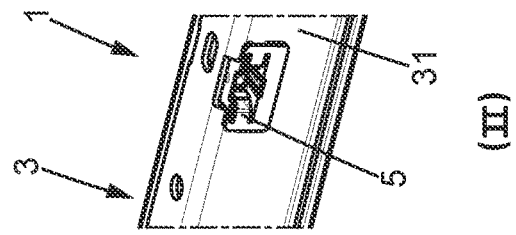
Figure 13A:
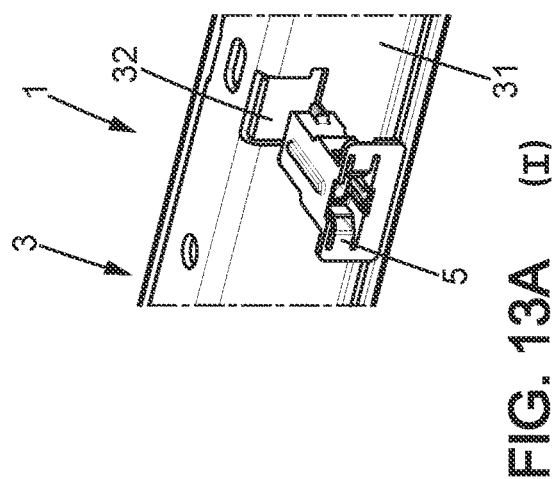
Figure 13B:
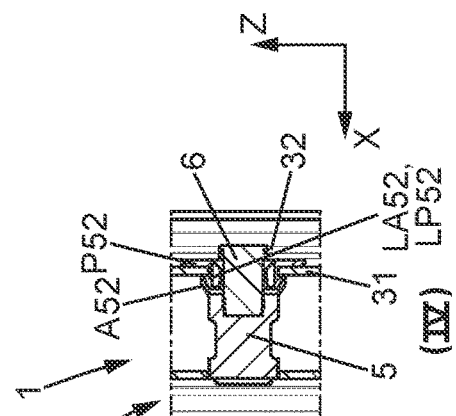
Figure 13B:
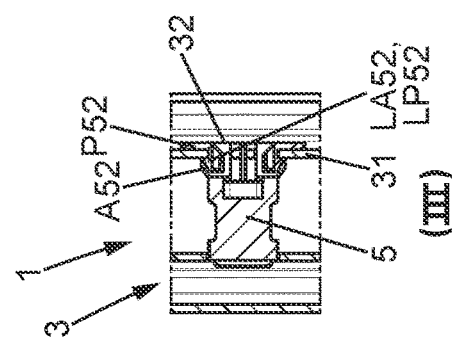
Figure 13B:
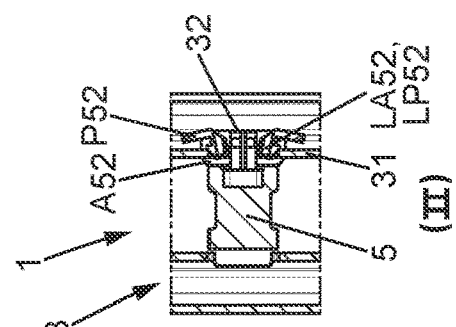
Figure 13B:
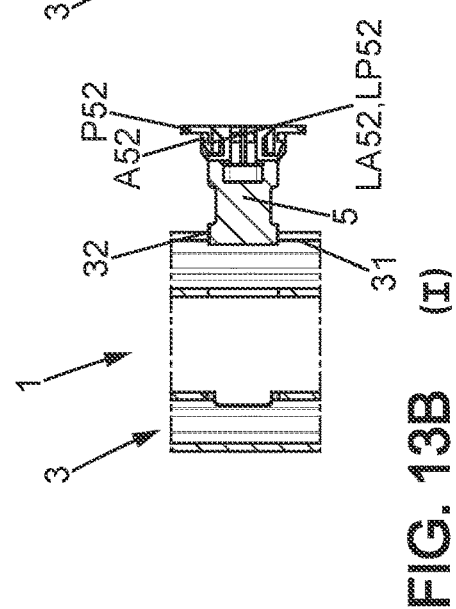
Figure 14:
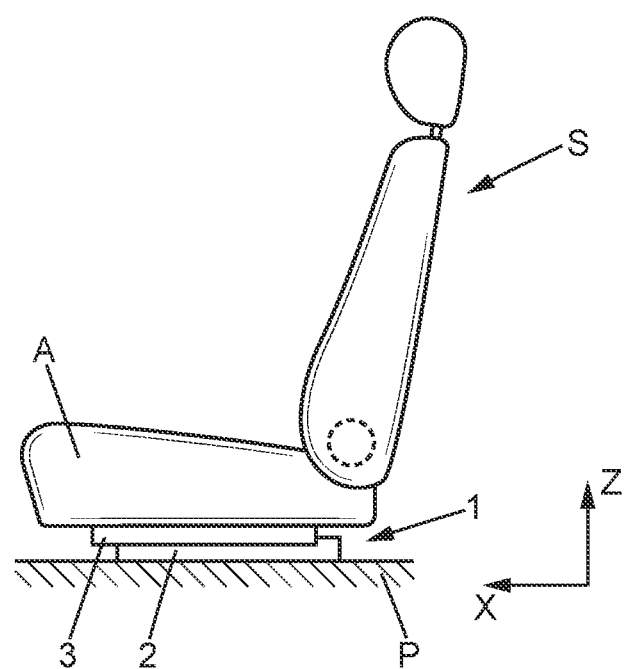

FIG. 13A schematically shows in perspective four steps i) to iv) of assembly and attachment of a case for a track to the track according to an embodiment conforming to the disclosure, and according to an embodiment of the process conforming to the disclosure;

FIG. 13B schematically shows in top view the four steps i) to iv) from FIG. 13A; and FIG. 14 schematically shows from the side the seat according to an embodiment conforming to the disclosure.

DETAILED DESCRIPTION

Throughout the present application:

the longitudinal direction X of the track corresponds to the direction of sliding of the male profile relative to the female profile, as can be seen in the figures;

the vertical direction Z of the track corresponds to the direction perpendicular to the longitudinal direction X and substantially perpendicular to the plane of the floor of the vehicle to which the track is intended to be fixed, as can be seen in the figures;

the transverse direction Y of the track corresponds the direction perpendicular to the longitudinal direction X and the vertical direction Z of the track, as can be seen in the figures;

the longitudinal X, vertical Z and transverse Y directions of the seat correspond to the longitudinal X, vertical Z and transverse Y directions of the track, as can be seen in the figures.

An axis is defined as a straight line along a set direction of the track. For example, a longitudinal axis is an axis along the longitudinal direction X of the track.

Also, front and rear extend along the longitudinal direction X of the track.

Similarly, upper and lower extend along the vertical direction Z of the track, with an orientation from the track profile intended to be fixed to the floor of the vehicle towards the profile intended to be fixed to the seat bottom of the seat.

Finally, throughout the present application, substantially longitudinal, transverse or vertical is understood to mean in orientation relative to the longitudinal direction, vertical direction or transverse direction with an angle less than 30°, which may advantageously be zero.

Similarly, substantially parallel is understood to mean an orientation with an angle less than 30°, which may advantageously be zero, relative to a given element The present disclosure relates to a track 1 for a vehicle seat comprising:

- a female rail 2, having at least one substantially flat wall 21;
- a male rail 3, also having at least one substantially flat wall, 31 mounted sliding relative to the female rail 2 along the longitudinal direction X of the track 1, where the female rail 2 comes to surround the male rail 3 along the transverse direction Y of the track 1, with the substantially flat wall 21 of the female rail 2 located across from the substantially flat wall 31 of the male rail 3;
- a position sensor 4 configured so as to determine the position of the male rail 3 relative to the female rail 2, at least along the longitudinal direction X of the track 1, where the position sensor 4 is received inside a case 5.

According to the disclosure, the case 5 is fixed to the male rail 3 at least partially extending into the volume of the male rail 3, such that the position sensor 4 is located across from the substantially flat wall 21 of the female rail 2, after having been inserted and slid through at least one opening 32 arranged in the substantially flat wall 31 of the male rail 3.

Figure 1:
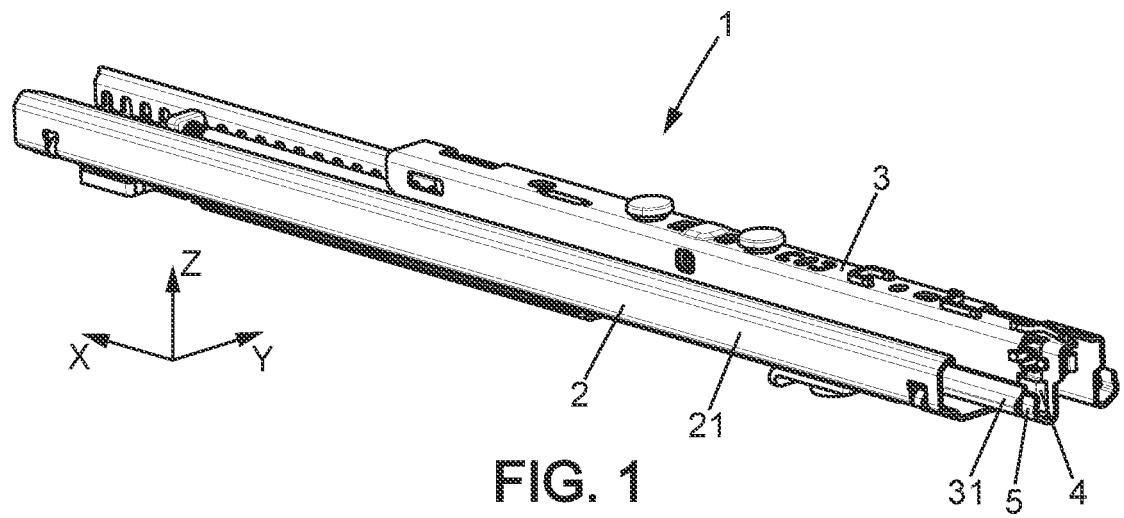
FIG. 1 is a perspective view of the track according to a first embodiment conforming to the disclosure.
Figure 2:
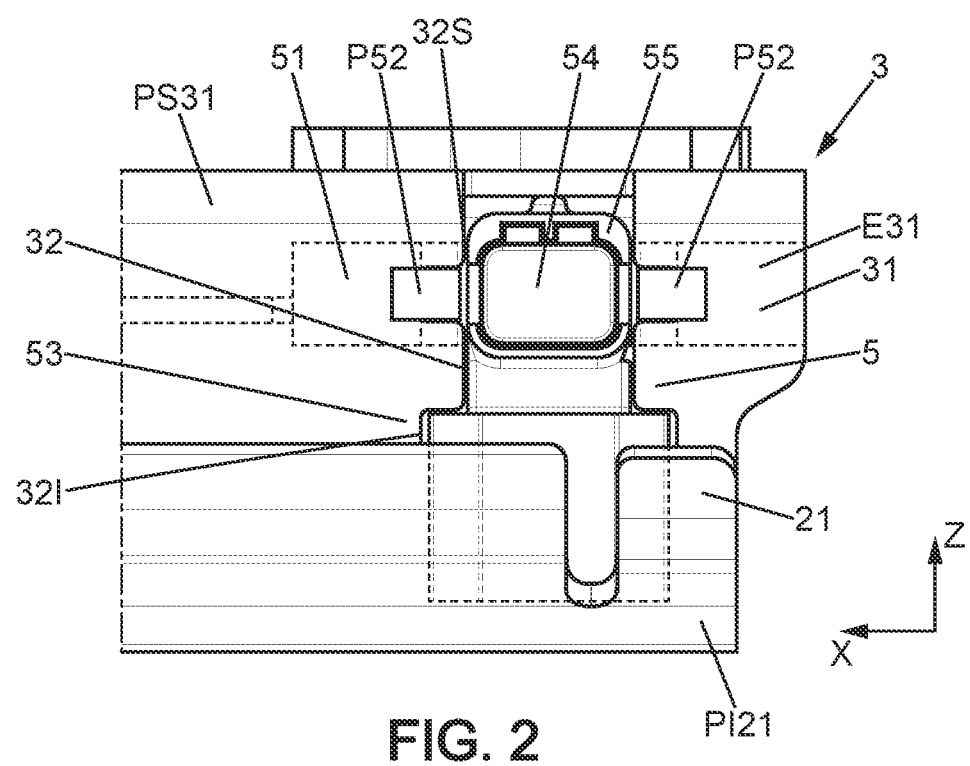
FIG. 2 is a left detailed view of the track from FIG. 1.
Figure 3:
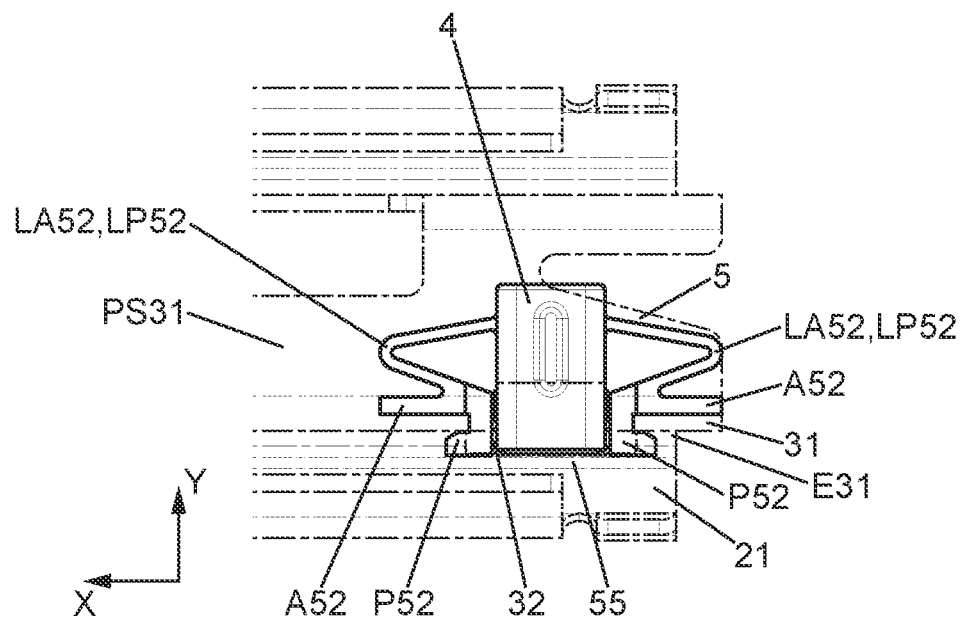
FIG. 3 is a top detail view of the track from FIG. 1, in which the male rail is transparent.
Figure 4:
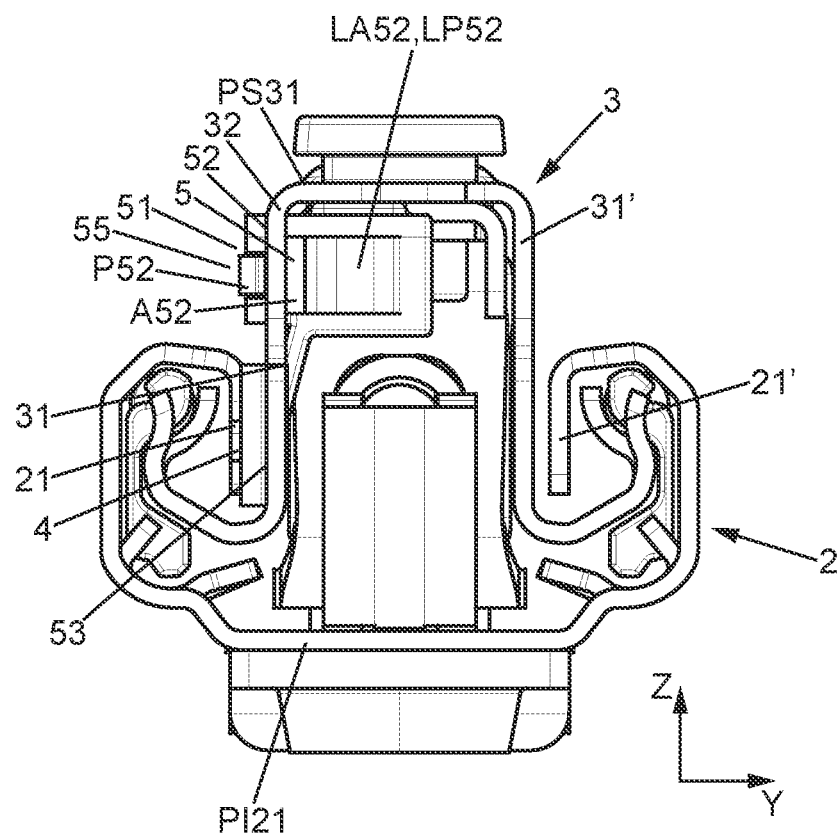
FIG. 4 is a rear detail view of the track from FIG. 1, in which the male rail is transparent.
Figure 10:
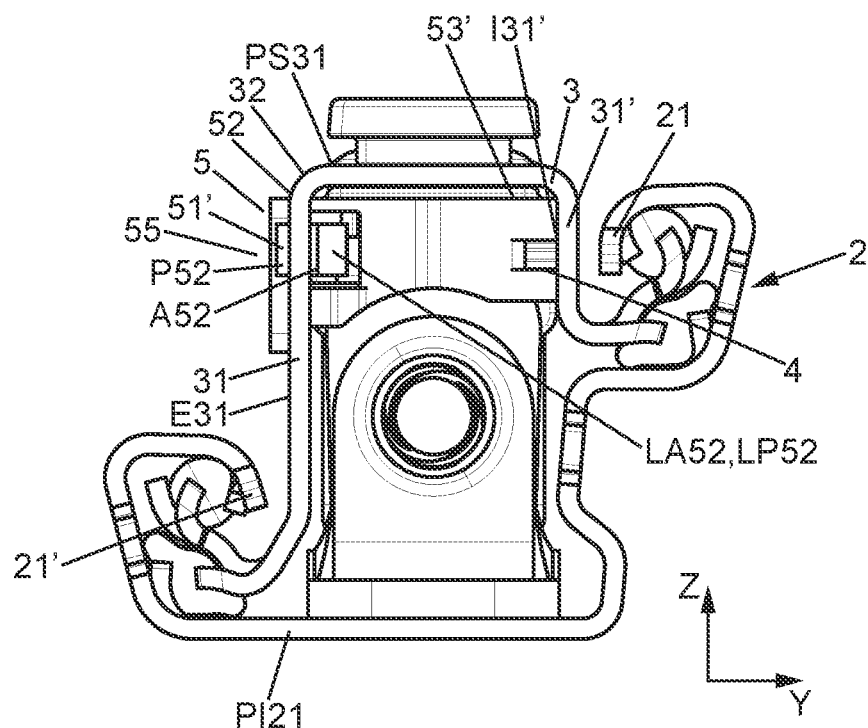
FIG. 10 is a rear detail view of the track from FIG. 7, in which the male rail is transparent.

Advantageously, and is seen more specifically in FIGS. 4 and 10, the case 5 is attached to the male rail 3 by extending completely in the volume of the female rail 2 along the transverse direction Y of the track 1.

The position sensor 4 and the case 5 therefore do not have any part which extends beyond the female rail 2 along the transverse direction Y of the track 1.

Thus, with such a design of the track, and as can be seen in FIGS. 1, 3, 4, 7, 9 and 10, the case 5, and therefore the position sensor 4, extends at least partially, and advantageously completely, into the volume of the male rail 3, meaning that the position sensor 4 and the case 5 have only a portion, or even nothing at all, which extends beyond the male rail 3 along any one of the longitudinal X, transverse Y and vertical Z directions of the track 1.

Because of this, the bulk of the track 1 according to the disclosure, and in particular along the transverse direction Y of the track 1 is substantially reduced compared to comparative tracks, because it does not comprise any element projecting outward from the female profile 2 along the transverse direction Y of the track 1 or even towards the outside of the male profile 3 along any one of the longitudinal X, transverse Y and vertical Z directions of the track 1, and in particular for the operation of the position sensor 4 and in contrast to the comparative tracks. The track 1 according to the disclosure therefore has a simplified design at a reduced unit cost as compared to comparative tracks.

Also, since the position sensor 4 and the case 5 thereof are laid out completely in the volume of the female rail 2 along the transverse direction Y of the track 1, even in the volume of the male rail 3, they are not at risk of being hit by an external element, like for example the foot of a user, and therefore presenting a risk of injury for the driver of the vehicle, or being damaged, which could prevent the operation of the position sensor 4 for fulfilling the role thereof, and in particular for providing for the safety of an occupant of a vehicle seat S attached to the floor P of a vehicle by means of the track 1 according to the disclosure.

The female rail 2 may in fact advantageously be fixed to the floor P of a vehicle whereas the male rail 3 may be connected to a seat S, and in particular to the seat bottom A of a seat S, as can be seen in FIG. 14.

The male rail 3 may for this purpose be positioned substantially above the female rail 2 along the vertical direction Z of the track 1.

The female rail 2 may advantageously be made generally of metal.

Also, the track 1 according to the disclosure turns out to be particularly simple and quick to make, by a human operator or by an automatic production means, like for example a robotic arm, in that the case 5 receiving the position sensor 4 is inserted simply and slid through the opening 32 before being attached to the male rail 3. Because of this, no element of the case 5 or the position sensor 4 has to be attached to the female rail 2 or elsewhere on the track 1, unlike the comparative tracks.

Because of this, the case 5 and therefore the position sensor 4 may be secured to the male rail 3 prior to assembly thereof with the female rail 2, or even subsequent to this assembly, and independently from the assembly of other elements of the rail 1.

The track 1 may be intended such that the movement of the male rail 3 relative to the female rail 2 along the longitudinal direction X of the track 1 is driven manually and/or via a drive means.

The position sensor 4 may comprise a means of measurement of the surrounding magnetic field, configured such that the magnetic field or a variation thereof measured by the means of measurement of the magnetic field serves to determine the position of the male rail 3 relative to the female rail 2 along the longitudinal direction X of the track 1.

Alternatively or supplementally, the position sensor 4 may comprise a mechanical switch, configured for being open, respectively closed, as a function of the position of the male rail 3 relative to the female rail 2 along the longitudinal direction X of the track 1, by being actuated by the substantially flat wall 21 of the female rail 2, or else an optical switch, configured for being open, respectively closed, as a function of the position of the male rail 3 relative to the female rail 2 along the longitudinal direction X of the track 1 by emitting an optical signal intended to be reflected or not by the substantially flat wall 21 female rail 2.

According to an embodiment, as can be seen more specifically in FIGS. 4 and 10:

the substantially flat wall 31 of the male rail 3 in which the opening 32 is arranged is a first vertical lateral wall 31 of the male rail 3, substantially extending along the longitudinal direction X and along the vertical direction Z of the track 1, and the case 5 is fixed to the male rail 3 after having been inserted and slid through the opening 32 substantially along the transverse direction of the track 1, where the male rail 3 has a second vertical lateral wall 31', substantially parallel, and advantageously identical, to the first vertical lateral wall 31;

the substantially flat wall 21 of the female rail 2 across from which the position sensor 4 is located is a vertical lateral wall 21 of the female rail 2, which extends substantially along the longitudinal direction X and along the vertical direction Z of the track 1, substantially parallel to the first vertical lateral wall 31 and the second vertical lateral wall 31' of the male rail 3, where the position sensor 4 is located across from the vertical lateral wall 21 of the female rail 2 along the transverse direction Y of the track 1.

The fact of fixing the case 5 on the first vertical lateral wall 31 of the male rail 3 with the position sensor 4 across from the vertical lateral wall 21 of the female rail 2 allows the position sensor 4 to be located closest to the vertical lateral wall 21 of the female rail 2 and thus to be able to easily measure the magnetic field or the variation thereof in the neighborhood of the vertical lateral wall 21 of the female rail 2, when it comprises a means of measurement of the magnetic field or, when it comprises a mechanical switch, allows the direct actuation thereof by the vertical lateral wall 21 of the female rail 2, or again, when it comprises an optical switch, to receive an optical signal or not intended to be reflected by the vertical lateral wall 21 of the female rail 2, and without risk of an interfering element lodging between the first vertical lateral wall 31 of the male rail 3 and the vertical lateral wall 21 of the female rail 2. Further, this also makes it possible to use a position sensor 4 and therefore a case 5 of reduced size, in order to limit the dimension of the case 5 and the position sensor 4, and in particular along the transverse direction Y of the track 1 and reduce the unit cost of the track 1.

In fact, and without going outside the scope of the present disclosure, attaching the case 5 on an upper horizontal wall PS31 of the male rail 3 could also be conceived, which could extend substantially along the longitudinal direction X and along the transverse direction Y of the track 1, as can be seen on FIGS. 4 and 10, in particular such that the position sensor 4 is located across from a lower horizontal wall PI21 of the female rail 2, along the vertical direction Z of the track 1, and be oriented towards the lower horizontal wall PI21 of the female rail 2.

The lower horizontal wall PI21 of the female rail 2 may also extend substantially along the longitudinal direction X and along the transverse direction Y of the track 1.

Just the same, such an arrangement of the case 5 can prove problematic, in that the lower horizontal wall PI21 of the female rail 2 is generally intended to be fixed to the floor P of the vehicle receiving the track 1 in order to assure the attachment of the female rail 2 and therefore at the track 1 to the floor P, which may interfere with the measurements of the position sensor 4. Also, the separation between the upper horizontal wall PS31 of the male rail 3 and the lower horizontal wall PI21 of the female rail 2 may allow elements to come in between them and therefore interfere with the measurements of the position sensor 4.

According to an embodiment, and as can be seen in FIGS. 1 to 5, the vertical lateral wall 21 of the female rail 2 across from which the position sensor 4 is located is arranged facing, along the transverse direction Y of the track 1, and directly by the first vertical lateral wall 31 of the male rail 3 in which the opening 32 is arranged, and opposite the second vertical lateral wall 31' of the male rail 3, along the transverse direction Y of the track 1.

According to the findings of the inventor, this embodiment proves particularly advantageous for tracks 1 called "symmetric," an example which is shown in FIGS. 1 to 5.

The track 1 is called "symmetric," when it has a substantially longitudinal axis of symmetry, meaning extending substantially along the longitudinal direction X of the track 1, and/or a substantially longitudinal plane of symmetry meaning extending substantially along the longitudinal direction X and the vertical direction Z of the track 1. The axis and/or the plane of symmetry may advantageously pass substantially through the center of the track 1 along the transverse direction Y of the track 1.

As can be seen more specifically in FIG. 4, such a "symmetric" track 1 has, in addition to the vertical lateral wall 21 of the female rail 2 across from which is located the position sensor 4, the first vertical lateral wall 21, a second vertical lateral wall 21', symmetric to the first vertical lateral wall 21 along the axis and/or plane of symmetry such as described above, and such as the second vertical lateral wall 21' of the female rail 2 is arranged facing, along the transverse direction Y of the track 1, and directly by the second vertical lateral wall 31' of the male rail 3, along the transverse direction Y of the track 1 and opposite the first vertical lateral wall 31 of the male rail 3 in which the opening 32 is arranged.

As can be seen in FIGS. 1 to 4, the case 5 and the opening 32 may then be configured such that the position sensor 4 extends, at least partially, through the opening 32.

Advantageously this makes it possible for the position sensor 4 to be located closest to the (first) vertical lateral wall 21 of the female rail 2 in order to be able to best estimate the position of the male rail 3 relative to the female rail 2.

Just the same, since the space between the first vertical lateral wall 31 of the male rail 3 and the (first) vertical lateral wall 21 of the female rail 2, along the transverse direction Y of the track 1, is substantially reduced, the position sensor 4 may advantageously be located in part in the volume of the male rail 3, depending on the dimension thereof.

Figure 6:
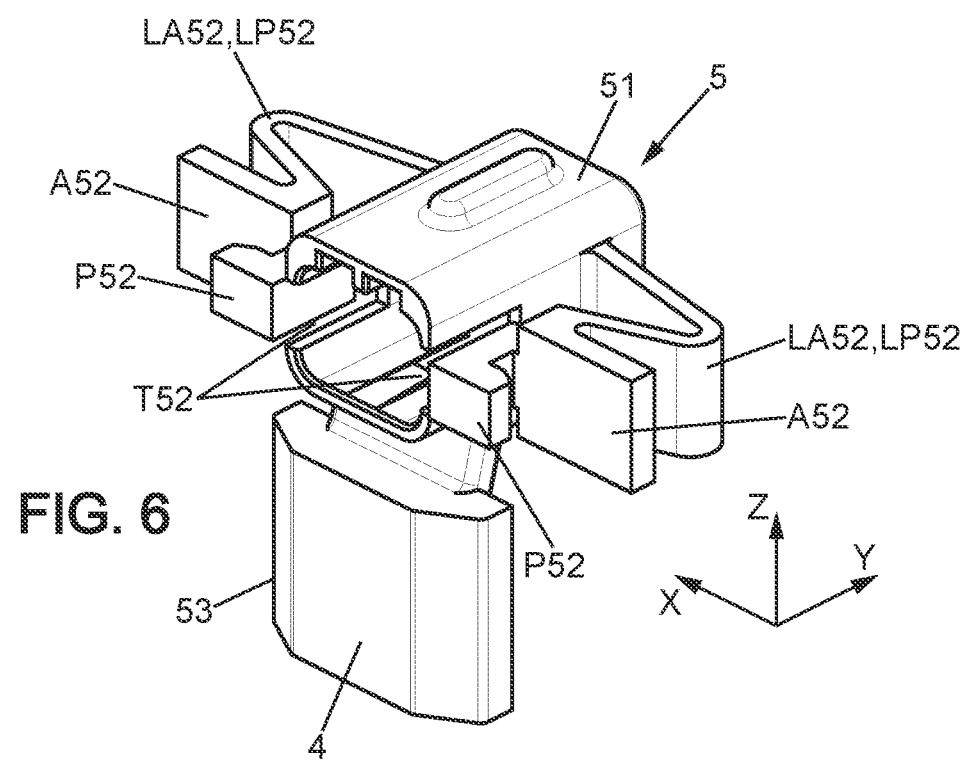
FIG. 6 is a perspective view of the case isolated from the slider from FIG. 1.

According to an embodiment, as can be seen in FIGS. 4 and 6:
- the case 5 comprises an upper attachment part 51 comprising an attachment system 52 and a lower part 53 for receiving the position sensor 4, positioned under the upper attachment part 51 along the vertical direction Z of the track 1, receiving the position sensor 4 on the inside;
- the opening 32 comprises an upper part 32S configured for receiving the upper part 51 for attaching the case 5 through the upper part 32S by sliding along the transverse direction Y of the track 1, and advantageously for preventing the sliding of the lower part 53 for receiving the position sensor 4 of the case 5 through the upper part 32S along the transverse direction Y of the track 1, where the attachment system 52 for the upper part 51 for attaching the case 5 provides the attachment of the case 5 to the first vertical lateral wall 31 of the male rail 3 near the upper part 32S of the opening 32;
- the opening 32 comprises a lower part 321, positioned under the upper part 32S of the opening 32 along the vertical direction Z of the slider 1, and configured for receiving the lower part 53 for receiving the position sensor 4 of the case 5 through the lower part 321 of the opening 32 by sliding along the transverse direction Y of the track 1.

Because of this advantageous arrangement from the disclosure, since the (first) vertical lateral wall 21 of the female rail 2 is located, along the transverse direction Y of the track 1, facing the lower part 321 of the opening 32, that serves to provide an easy mounting and assembly of the case 5 onto the male rail 3 and to provide that the position sensor 4 is located facing the (first) vertical lateral wall 21 of the female rail 2, so as to be able to optimally determine the position of the male rail 3 relative to the female rail 2 along the longitudinal direction X of the track 1.

Figure 5:
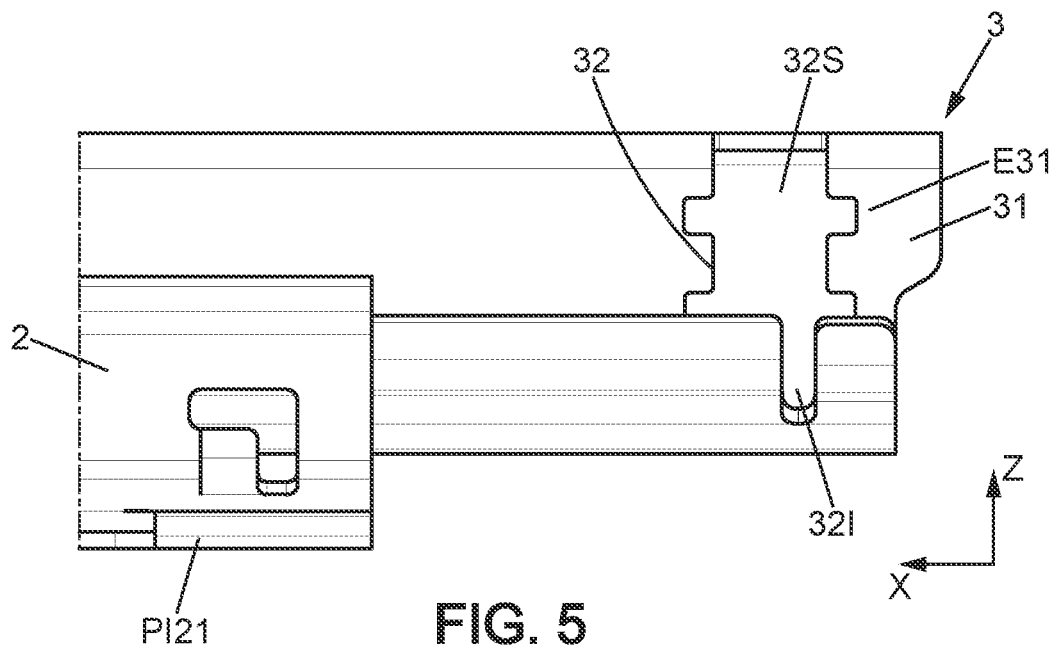
FIG. 5 is a detailed view similar to the one from FIG. 2 in which the case and the position sensor are not shown.

Advantageously and as can be seen in FIG. 5, the upper part 32S of the opening 32 may have a transverse section (i.e. in the plane perpendicular to the transverse direction Y of the track 1) substantially identical, up to the nesting and sliding play, to that of the upper part 51 for attaching the case 5.

Similarly, the lower part 321 of the opening 32 may have a transverse section substantially identical, up to the nesting and sliding play, to that of the lower part 53 for receiving the position sensor 4 of the case 5.

Advantageously, and as can more specifically be seen in FIG. 6, the lower part 53 for receiving the position sensor 4 may be located substantially in the extension of the upper part 51 for attaching the case 5, along the vertical direction Z of the track 1.

According to an embodiment, the lower part 53 for receiving the position sensor 4 is located joined against an inner surface 121 of the vertical lateral wall 21 of the female rail 2 along the transverse direction Y of the track 1, such that the position sensor 4 is located closest to the vertical lateral wall 21 of the female rail 2 along the transverse direction Y of the case 1.

This advantageous arrangement from the disclosure serves to improve the measurement by the position sensor 4 of the position of the male rail 3 relative to the female rail 2 along the longitudinal direction X of the track 1.

Advantageously, without going outside the scope of the present disclosure, and for an analogous result, the lower part 53 for receiving the position sensor 4 may be located separated from the inner surface 121 of the vertical lateral wall 21 of the female rail 2 along the transverse direction Y of the track 1, by a short distance, advantageously less than 10 mm, preferably less than 5 mm, and in order to avoid rubbing between the lower part 53 for receiving position sensor 4 and the lower part 121 of the vertical wall 21 of the female rail 2, during movement of the male rail 3 relative to the female rail 2 along the longitudinal direction X of the track 1.

According to an embodiment and as can be seen in FIGS. 7 to 11, the vertical lateral wall 21 of the female rail 2 across from which the position sensor 4 is located is arranged facing, along the transverse direction Y of the track 1, and directly by the second vertical lateral wall 31' of the male rail 3, and opposite the first vertical lateral wall 31 of the male rail 3 in which the opening 32 is arranged, along the transverse direction of the track 1.

According to the findings of the inventor, this embodiment proves particularly advantageous for tracks 1 called "asymmetric," an example which is shown in FIGS. 7 to 11.

The track is called "asymmetric," when it does not have any substantially longitudinal axis of symmetry, meaning extending substantially along the longitudinal direction X of the track 1, and/or a substantially longitudinal plane of symmetry meaning extending substantially along the longitudinal direction uppercase X and the vertical direction Z of the track 1. The axis and/or the plane of symmetry may advantageously pass substantially through the center of the track 1 along the transverse direction Y of the track 1.

More precisely, the male rail 3 may have a substantially longitudinal axis of symmetry, i.e. extending substantially along the longitudinal direction X of the slider 1, and/or a substantially longitudinal plane of symmetry, i.e. extending substantially along the longitudinal direction X and along the vertical direction Z of the track 1, where the axis and/or the plane of symmetry advantageously passes substantially through the center of the track 1 along the transverse direction Y of the track 1, whereas the female rail 2 does not have a longitudinal axis or plane of symmetry.

As can be seen more specifically in FIG. 10, in such an "asymmetric" track 1 the vertical lateral wall 21, advantageously the first vertical lateral wall 21, may extend substantially to the area of the upper horizontal wall PS31 of the male rail 3, along the vertical direction Z of the track 1. The "asymmetric" track may also have a second vertical lateral wall 21', substantially parallel to the first vertical lateral wall 21, and having a height along the vertical direction Z, for example, as can be seen on FIG. 10, extending substantially solely to the height of the lower horizontal wall PI21 of the female rail 2 along the vertical direction Z of the track 1. The second vertical lateral wall 21' may be arranged facing, along the transverse direction Y of the track 1, and directly by the first vertical lateral wall 31 of the male rail 3, in which the opening 32 is arranged, along the transverse direction Y of the track 1 and opposite the second vertical lateral wall 31' of the male rail 3.

Because of this, and as proposed by this embodiment, according to the inventor's findings, it is preferable to position the opening 32 on the first vertical lateral wall 31 of the male rail 3, facing the second vertical lateral wall 21' of the female rail 2, which has a reduced dimension along the vertical direction Z of the track 1 and so as to make it easier to insert and slide the case 5 through the opening 32 along the transverse direction Y of the track 1.

Figure 11:
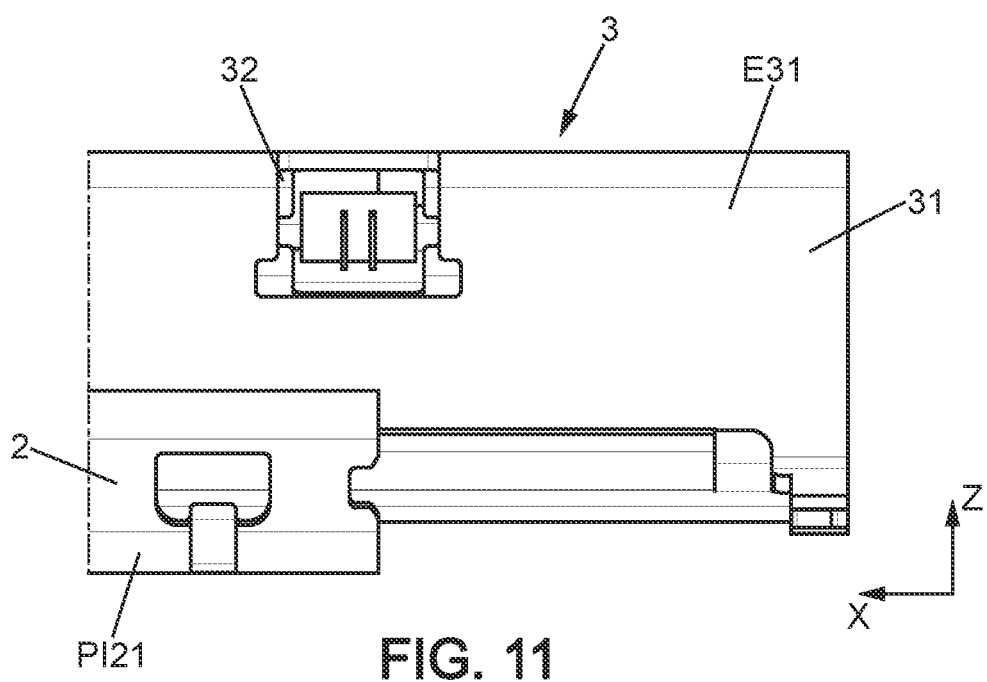
FIG. 11 is a detailed view similar to the one from FIG. 8 in which the case and the position sensor are not shown.
Figure 12A:
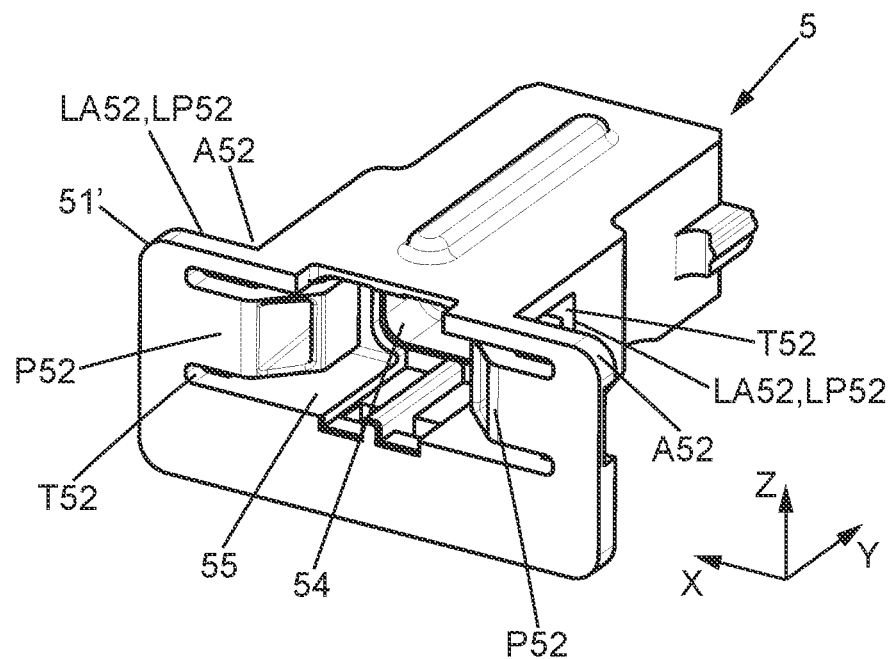
FIG. 12A is a perspective view of the case isolated from the slider from FIG. 7.
Figure 12B:
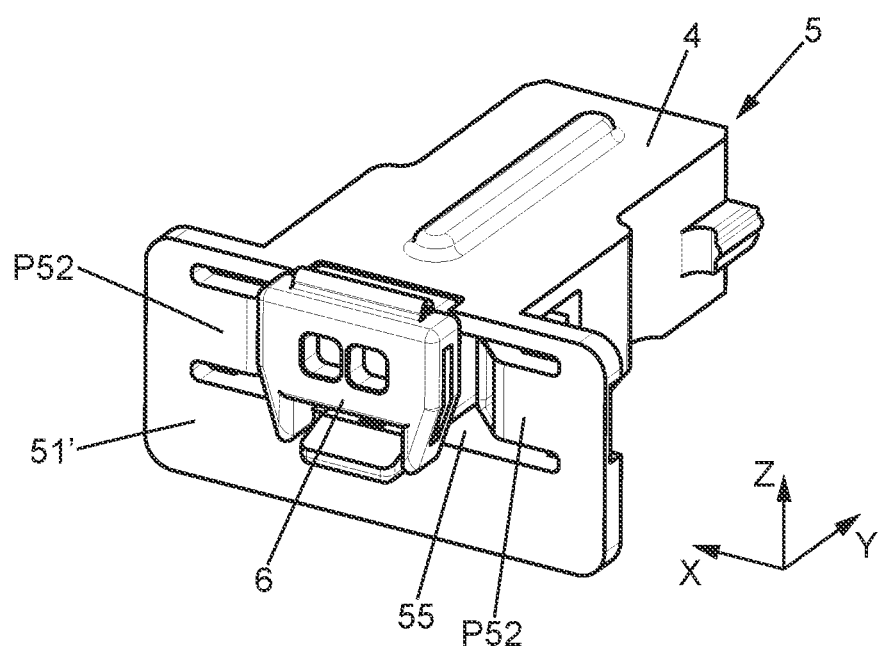
FIG. 12B is a perspective view of the case from FIG. 12A in which a connection interface is received into the housing for receiving the case.

According to an embodiment, as can be seen in FIGS. 11, 12A and 12B:
the case 5 comprises a first part 51' for attaching the case 5 comprising an attachment system 52 and a second part 53' for receiving the position sensor 4, positioned in the extension of the first upper attachment part 51 along the transverse direction Y of the track 1, receiving the position sensor 4 on the inside, where the attachment system 52 of the first part 51' for attaching the case 5 provides the attachment of the case 5 to the first vertical lateral wall 31 of the male rail 3 near the opening 32;
the opening 32 is configured in order to receive the first attachment part 51' and the second part 53' for receiving the position sensor 4 of the case 5 through the opening 32 by sliding along the transverse direction Y of the track 1.

The case 5 thus has a reduced dimension along the vertical direction Z of the track 1.

Figure 7:
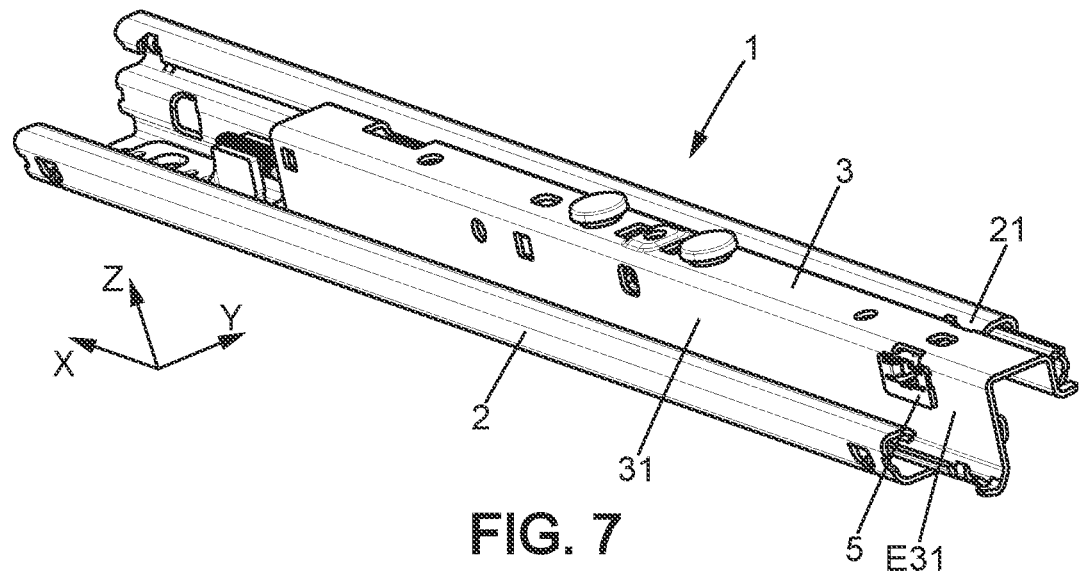
FIG. 7 is a perspective view of the track according to a second embodiment conforming to the disclosure.
Figure 8:
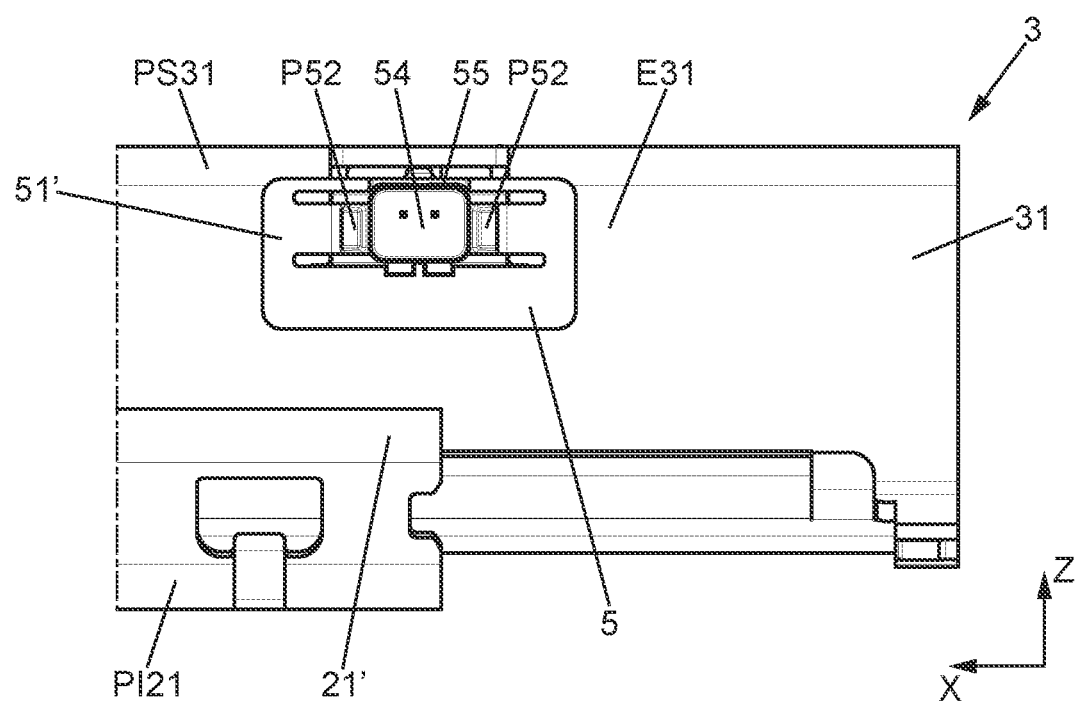
FIG. 8 is a left detailed view of the track from FIG. 7.

Advantageously, as can be seen in FIGS. 7, 8 and 10, in order to make the mounting and attachment of the case 5 onto the male rail easier by inserting and sliding the case 5 through the opening 32 along the transverse direction Y of the track 1, without being bothered by the second vertical lateral wall 21' of the female rail 2, the opening 32 may be arranged in the upper part of the first vertical lateral wall 31 of the male rail 3, along the vertical direction Z of the track 1, i.e. near the upper horizontal wall PS31 of the male rail 3.

According to an embodiment and as can be seen in FIG. 10, the second part 53' for receiving the position sensor 4 is located bearing against an inner surface I31' of the second vertical lateral wall 31' of the male rail 3, such that the position sensor 4 is located closest to the vertical lateral wall 21 of the female rail 2 along the transverse direction of the case 1.

This advantageous arrangement from the disclosure serves to improve the measurement by the position sensor 4 of the position of the male rail 3 relative to the female rail 2 along the longitudinal direction X of the track 1.

This also makes it possible to improve the stability of attaching the case 5 to the male rail 3, since this is also retained because of rubbing against the inner surface I31' of the second vertical lateral wall 31' of the male rail 3, in addition to the attachment system 52.

Advantageously, without going outside the scope of the present disclosure, and for a similar result, the second part 53' for receiving the position sensor 4 may be located separated from the inner surface I31' of the second vertical lateral wall 31' of the male rail 3 along the transverse direction Y of the track 1 by a short distance, advantageously less than 10 mm, preferably less than 5 mm.

According to an embodiment, and as can be seen in FIG. 12B, the upper part 51, respectively the first part 51', for attaching the case 5 comprises a receiving housing 54 configured for receiving and holding in position a connection interface 6 connected to one or more cables (not shown), in particular electrical, arranged for being connected to the position sensor 4, where the receiving housing 54 extends substantially along the transverse direction Y of the track 1 in the upper part 51, respectively the first part 51', of the attachment case 5, and has an opening end 55 positioned near the opening 32 arranged on the first vertical lateral wall 31 of the male rail 3, where the receiving housing 54 opens out towards the outside of the male rail 3 near the opening end 55 of the receiving housing 54.

The receiving housing 54 is thus easily accessible from outside of the male rail 3 in order to allow receiving of the connection interface 6, necessary to the operation of the position sensor 4, for example in order to provide electric power for it or allow it to communicate with other elements of the vehicle receiving a seat S comprising the track 1, like for example a control unit (not shown), which makes manufacturing and installation of the track 1 according to the disclosure in a vehicle easier.

According to an embodiment, and as can be seen in FIGS. 3, 4, 6, 9, 10, 12A and 12B, the attachment system 52 comprises:
two attachment tabs P52 secured with the upper part 51, respectively the first part 51', for attaching the case 5, positioned on either side of the opening end 55 of the receiving housing 54 along the longitudinal direction X of the track 1, and coming to bear against an outer surface E31 of the first vertical lateral wall 31 of the male rail 3, on both sides of the opening 32, respectively from the upper part of the opening 32S, along the longitudinal direction X of the track 1; and
two counter-bearing surfaces A52, substantially flat, secured to the upper part 51, respectively the first part 51', for attaching the case 5, positioned on either side of the opening end 55 of the receiving housing 54 along the longitudinal direction X of the track 1, and coming to bear against an inner surface I31 of the first vertical lateral wall 31 of the male rail 3, on either side of the opening 32, respectively of the upper part of the opening 32S, along the longitudinal direction X of the track 1, and each positioned substantially across from an attachment tab P52 along the transverse direction Y of the slider 1, such that the first vertical lateral wall 31 of the male rail 3 is sandwiched between each attachment tab P52/counter-bearing surface A52 pair located across from each other along the transverse direction Y of the track 1;

Such an attachment system 52 serves to hold the case 5 to the male rail 3 stably and durably, and has a simple design which makes manufacturing of the case 5 and therefore of the track 1 easier, and serves to reduce the unit cost thereof.

Figure 9:
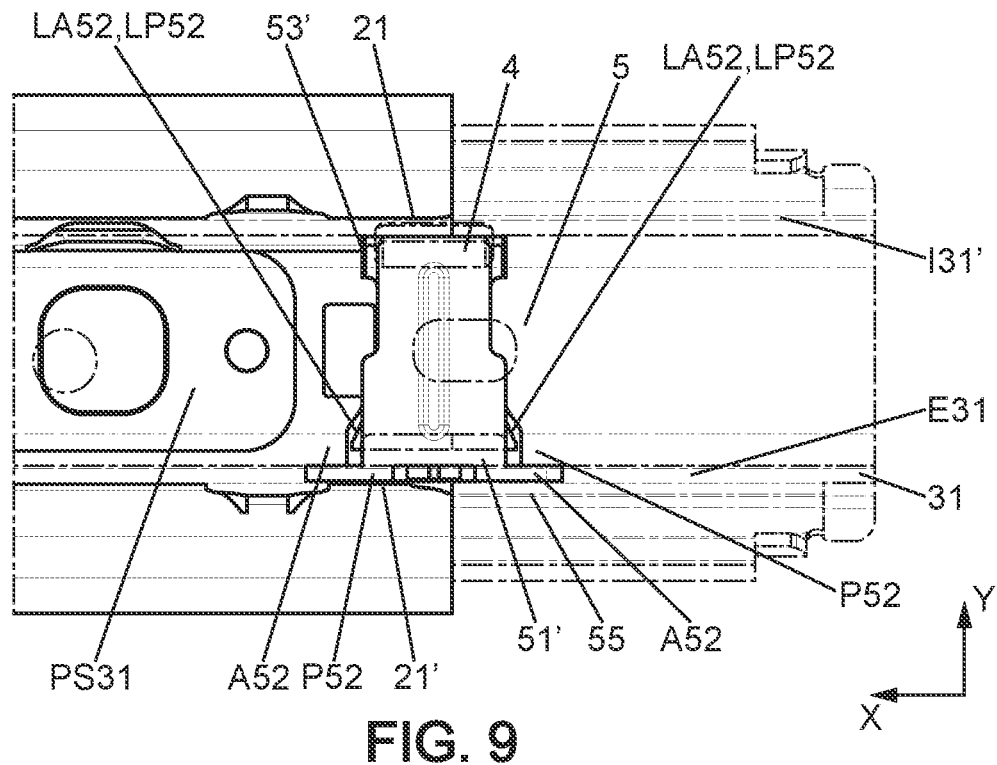
FIG. 9 is a top detail view of the track from FIG. 7, in which the male rail is transparent.

According to an embodiment, and as can be seen more specifically in FIGS. 9, 12A and 12B, the attachment system 52 comprises:

- two elastic connections LP52 each connecting one attachment tab P52 to the upper part 51, respectively the first part 51', for attaching the case 5, each configured so as to allow the movement of each attachment tab P52 relative to the housing 54 for receiving the case 5 generally along the longitudinal direction X of the slider 1;
- two elastic connections LA52 each connecting one counter-bearing surface A52 to the upper part 51, respectively the first part 51', for attaching the case 5, each configured so as to allow the movement of each counter-bearing surface A52 relative to the housing 54 for receiving the case 5 generally along the longitudinal direction X of the slider 1.

As can be seen in steps i) and ii) of FIGS. 13A and 13B, each attachment tab P52, and possibly each counter-bearing surface A52, may thus be positioned, at least in part, inside the housing 54 for receiving the case 5 without extending beyond the opening 32 arranged on the first vertical lateral wall 31 of the male rail 3 along the longitudinal direction X of the track 1, in order to allow insertion and sliding of the case 5 through the opening 32 arranged in the first vertical lateral wall 31 of the male rail 3 along the transverse direction of the track 1.

As can be seen in the steps ii) and iii) of FIGS. 13A and 13B, each attachment tab P52 and each counter-bearing surface A52 may move, because of the elasticity of each elastic connection LP52, LA52, relative to the upper part 51, respectively the first part 51', for attaching the case 5, generally along the longitudinal direction X of the track 1 in order to be deployed outside the housing 54 for receiving the case 5 and that the attachment tabs P52 and the counter-bearing surfaces A52 are positioned on either side of the opening end 55 of the receiving housing 54 along the longitudinal direction X of the track 1, advantageously outside the receiving housing 54, in order that the first lateral wall 31 of the male track 3 is sandwiched between each attachment tab P52/counter-bearing surface A52 pair located facing along the transverse direction Y of the track 1 with each attachment tab P52 coming to bear against the outer surface E31 of the first vertical lateral wall 31 of the male rail 3 and each counter-bearing surface A52 coming to bear against the inner surface I31 of the first vertical lateral wall 31 of the male rail 3, in order to provide the attachment of the case 5 to the male rail 3.

The elastic connections LP52, respectively LA52, may advantageously be configured so as to urge the attachment tabs P52, respectively the counter-bearing surfaces A52, towards the deployed position thereof outside of the receiving housing 54 providing for attaching the case 5 to the first vertical lateral wall 31 of the male rail 3, this being found sandwiched between each attachment tab P52/counter-bearing surface A52 pair located facing along the transverse direction Y of the track 1.

Also, the elastic connections LP52, respectively LA52, may advantageously be configured such that the attachment tabs P52, respectively the counter-bearing surfaces A52, may be moved relative to the upper part 51, respectively the first part 51', for attaching the case 5, generally along the longitudinal direction X of the track 1 toward the position thereof retracted into the receiving housing 54, with a reduced force, advantageously such as that which a human operator could apply, and in order to make the attachment of the case 5 to the male rail 3 by a human operator easier.

In that way, the mounting and attachment of the case 5 to the male rail 3 turns out to be particularly simple and quick to do, and in particular for a human operator. In fact, because of such a design of the attachment system 52, once the case 5 is in the intended position relative to the male rail 3, after having been inserted and slid substantially along the transverse direction Y through the opening 32, the attachment tabs P52 and the counter-bearing surfaces A52 deploy automatically outside the receiving housing 54 because of the elasticity of the elastic links LP52, respectively LA54, in order to provide the attachment of the case 5 to the first vertical lateral wall 31 of the male rail 3.

Further, If the case 5 is not located in the intended position relative to the male rail 3, the attachment tabs P52 and/or the counter-bearing surfaces A52 do not deploy, or do not fully deploy, outside the receiving housing 54, such that it may turn out to be impossible to house the interface connection 6 in it such as described above. The attachment system 52 thereby simultaneously fills a function of preventing incorrect alignment, allowing an operator to easily and quickly verify that the case 5 was correctly attached to the first vertical lateral wall 31 of the male rail 3.

Advantageously, as can be seen in FIGS. 9, 12A, 12B, 13A and 13B, the elastic connections LP52, respectively LA52, may be configured such that the attachment tabs P52, respectively the counter-bearing surfaces A52, may move relative to the upper part 51, respectively the first part 51', for attaching the case 5, generally along the longitudinal direction X of the track 1 by a rotation relative to the upper part 51, respectively the first part 51', for attaching the case 5, around a substantially vertical axis, which simplifies the design and implementation of such elastic connections LP52, respectively LA52.

Advantageously, as can be seen in FIGS. 6, 12A and 12B, in order to make implementation of the case 5 easier and reduce the unit cost thereof, the elastic connection LP52 connecting the attachment tab P52 to the upper part 51, respectively the first part 51', for attaching the case 5, may be coincident with the elastic connection LA52 connecting the counter-bearing surface A52 to the upper part 51, respectively the first part 51', for attaching the case 5 the one or each attachment tab P52/counter-bearing surface A52 pair located facing along the transverse direction Y of the track 1.

As can also be seen on FIGS. 6, 12A and 12B, through holes T52, extending in particular along the transverse direction Y and along the vertical direction Z of the track 1, may be arranged on both sides of the receiving housing 54 along the longitudinal direction X of the track 1, so as to allow the attachment tabs 52, and possibly the counter-bearing surfaces A52, to enter, at least partially, into the receiving housing 54.

According to an embodiment, the case 5 is made of a single unit, advantageously of plastic, such as for example polyoxymethylene (POM).

This advantageous arrangement from the disclosure serves to make manufacturing of the case 5 easier and to reduce the unit cost thereof. The case 5 may thus for example be made by molding.

Alternatively, and without going outside the scope of the present disclosure, the case 5 may also be made in two or more parts assembled with each other, in advance or during the attachment of the case 5 to the male rail 3 of the track 1, and in particular in the case where the case 5 comprises a first part 51' for attaching the case 5 and a second part 53' for receiving the position sensor 4, positioned in the extension of the first upper attachment part 51 along the transverse direction Y of the track 1, such as described above, advantageously used for a track 1 described as "asymmetric."

The disclosure also relates to a manufacturing process for a track 1 according to one of the embodiments previously described comprising:
- a) inserting the case 5 for the position sensor 4 through the opening 32 arranged on the substantially flat wall 31 of the male rail 3;
- b) sliding the case 5 relative to the male rail 3 through the opening 32 arranged on the substantially flat wall 31 of the male rail 3 substantially along the transverse direction Y of the track 1 such that the case 5 extends at least partially into the volume of the male rail 3, and advantageously completely into the volume of the female rail 2 along the transverse direction Y of the track 1, with the position sensor 4 across from the substantially flat wall 21 of the female rail 2;
- c) attaching the case 5 to the male rail 3.

All the dispositions previously described relating to the manufacturing of the track 1 according to the disclosure apply to the process for manufacturing the track 1 according to the disclosure.

In particular and as explained above, such a manufacturing process is particularly simple and quick to implement, by a human operator or by automatic manufacturing, like a robotic arm, for example.

According to an embodiment of the process, and as can be seen for example in FIGS. 13A and 13B:
- during steps a) and b), each attachment tab P52 and each counter-bearing surface A52 is positioned, at least in part, inside the housing 54 for receiving the case 5 without extending beyond the opening 32 arranged on the first vertical lateral wall 31 of the male rail 3 along the longitudinal direction X of the track 1; and
- during step c), the attachment tabs P52 and the counter-bearing walls A52 are deployed outside of the receiving housing 54 for the case 5 such that the attachment tabs P52 and the counter-bearing surfaces A52 are positioned on either side of the opening end 55 of the receiving housing 54 along the longitudinal direction X of the track 1, in order that the first vertical lateral wall 31 of the male rail 3 is sandwiched between each attachment tab P52/counter-bearing surface A52 pair located across from it along the transverse direction Y of the track 1 with each attachment tab P52 coming to bear against the outer surface E31 of the first vertical lateral wall 31 of the male rail 3 and each counter-bearing surface A52 coming to rest against the inner surface I31 of the first vertical lateral wall 31 of the male rail 3, from both sides of the opening 32, respectively from the upper part 32S of the opening 32, along the longitudinal direction X of the track 1, in order to provide the attachment of the case 5 to the male rail 3.

The step i) from FIGS. 13A and 13B show a) of the process schematically. The step ii) from FIGS. 13A and 13B show b) of the process schematically. The step iii) from FIGS. 13A and 13B show c) of the process schematically. The step iv) from FIGS. 13A and 13B shows schematically the insertion of the connection interface 6, such as described above, in the housing 54 for receiving the case 5, being involved at the outcome of step c).

As explained above, such an embodiment of the method proves particularly advantageous in that the attachment of the case 5 to the male rail 3 by the process according to the disclosure is particularly simple and quick to implement, and in particular for a human operator. In fact, because of such a design of the attachment system 52, once the case 5 is in the intended position relative to the male rail 3 at the outcome of b), after having been inserted and slid substantially along the transverse direction Y through the opening 32, the attachment times P52 and the counter-bearing surfaces A52 deploy automatically outside the receiving housing 54 neither side of the opening 32 along the longitudinal direction X of the track 1, because of the elasticity of the elastic links LP52 respectively LA52, in order to provide the attachment of the case 5 to the first vertical lateral wall 31 of the male rail 3.

Further, if the case 5 is not located in the intended position relative to the male rail 3, the attachment tabs P52 and/or the counter-bearing surfaces A52 do not deploy, or do not fully deploy, outside the receiving housing 54; it may turn out to be impossible to house the interface connection 6 in it such as described above. The process according to the disclosure proves to be particularly reliable in that, since the attachment system 52 simultaneously fulfills a function of blocking incorrect alignment, it serves to provide that the case 5 was correctly attached to the first vertical lateral wall 31 of the male rail 3.

As can be seen in FIG. 14, the disclosure finally relates to vehicle seat S comprising a track 1 according to one of the embodiments previously described.

All the dispositions previously described relating to the manufacturing of the track 1 according to the disclosure apply to the seat S according to the disclosure.

The seat S may in particular be an automotive vehicle seat S.

As can be seen in FIG. 14, and as explained above, the male rail 3 of the track 1 may advantageously be connected to the seat bottom 1 of the seat S, whereas the female rail 2 is intended to be fixed to the floor P of the vehicle receiving the seat S.

Naturally other embodiments could be conceived by the person skilled in the art without going outside the framework of the disclosure defined by the claims below.

A comparative track has a female rail and a male rail, mounted sliding relative to the female rail along the longitudinal direction of the comparative track, where the female rail comes to surround the male rail along the transverse direction of the comparative track. This comparative track also has a position sensor configured for determining the position of the female rail relative to the male rail, engaging with a substantially L-shaped bump, arranged on an outer lateral wall of the female rail, projecting outward from the female rail along the transverse direction of the comparative track. The position sensor, in the case at hand a magnetic field sensor, is fixed on a support, arranged on an outer lateral wall of the male rail, projecting outward from the male rail, and intended to receive the L-shaped bump on the inside, such that the position sensor is located across from the L-shaped bump. The magnetic field, or a variation thereof, measured by the position sensor makes it possible to know the position of the female rail relative to the male rail along the longitudinal direction of the comparative track, and therefore of the seat intended to be fixed to the floor of the vehicle via the comparative track, and for example in order to be able to manage the deployment of a passenger retention system, like an airbag, for example.

Such a comparative track has several disadvantages.

First, the design of the position sensor using an engagement with the L-shaped bump fixed projecting outward on the female rail along the transverse direction of the slider substantially increases the dimension of the comparative track, in particular along the transverse direction thereof.

Also, such a design of the position sensor, with in particular the need for engagement with the L-shaped bump, fixed projecting outward on the female rail of the track along the transverse direction of the track, makes the design of the comparative track more complex and substantially increases the unit cost thereof.

Further, since the position sensor has the use of elements projecting outward from the female rail along the transverse direction of the track, there is a risk of being damaged by other elements of the vehicle onto which the track is fixed, like for example the feet of an occupant of the vehicle, and may no longer be capable of functioning, which could represent an increased risk for the safety of the occupants of the vehicle in which a seat is fixed to the floor via the track.

Finally, such a comparative track turns out to be long and complex to manufacture, which also substantially increases the unit cost thereof.

The present disclosure aims to improve the situation.

The objective of the present disclosure is therefore to propose a track for a vehicle seat comprising a female rail and a male rail mounted sliding relative to each other along a longitudinal direction of the track, where the female rail comes to surround the male rail along the transverse direction of the track, and with a position sensor configured for determining the position of the male rail relative to the female rail with simplified design, reduced dimensions, in particular along the transverse direction of the track, and reduced unit cost.

Another objective of the present disclosure is to propose such a slider improving the safety for the occupants of the vehicle.

Another objective of the present disclosure is to propose such a slider that is rapid and simple to manufacture.

Thus, the disclosure relates to a slider for a vehicle seat comprising:
- a female rail, having at least one substantially flat wall;
- a male rail, also having at least one substantially flat wall, mounted sliding relative to the female rail along the longitudinal direction of the track, where the female rail comes to surround the male rail along the transverse direction of the track, with the substantially flat wall of the female rail located across from the substantially flat wall of the male rail;
- a position sensor configured so as to determine the position of the male rail relative to the female rail, at least along the longitudinal direction of the track, where the position sensor is received inside a case.

According to the disclosure, the case is fixed to the male rail at least partially extending into the volume of the male rail, such that the position sensor is located across from the substantially flat wall of the female rail, after having been inserted and slid through an opening arranged in the substantially flat wall of the male rail.

The features disclosed in the following paragraphs may, optionally, be implemented. They may be implemented independently of each other or in combination with each other:
- the substantially flat wall of the male rail in which the opening is arranged is a first vertical lateral wall of the male rail, substantially extending along the longitudinal direction and along the vertical direction of the track, and in which the case is fixed to the male rail after having been inserted and slid through the opening substantially along the transverse direction of the track, where the male rail has a second vertical lateral wall, substantially parallel, and advantageously identical, to the first vertical lateral wall, and the substantially flat wall of the female rail across from which the position sensor is located is a vertical lateral wall of the female rail, which extends substantially along the longitudinal direction and along the vertical direction of the track, substantially parallel to the first vertical lateral wall and the second vertical lateral wall of the male rail, where the position sensor is located across from the vertical lateral wall of the female rail along the transverse direction of the track;
- the vertical lateral wall of the female rail across from which the position sensor is located is arranged facing, along the transverse direction of the track, and directly by the first vertical lateral wall of the male rail in which the opening is arranged, and opposite the second vertical lateral wall of the male rail, along the transverse direction of the track;
- the case and the opening are configured such that the position sensor extends, at least partially, through the opening:
- the case comprises an upper attachment part comprising an attachment system and a lower part for receiving the position sensor, positioned under the upper attachment part along the vertical direction of the track, receiving the position sensor on the inside, and the opening comprises an upper part configured for receiving the upper part for attaching the case through the upper part by sliding along the transverse direction of the track, and advantageously for preventing the sliding of the lower part of the case for receiving the position sensor through the upper part along the transverse direction of the track, where the attachment system for the upper part for attaching the case provides the attachment of the case to the first vertical lateral wall of the male rail near the upper part of the opening, and the opening comprises a lower part, positioned under the upper part of the opening along the vertical direction of the slider, and configured for receiving the lower part for receiving the position sensor of the case through the lower part of the opening by sliding along the transverse direction of the track;
- the lower part for receiving the position sensor is located joined against an inner surface of the vertical wall of the female rail along the transverse direction of the track, such that the position sensor is located closest to the vertical lateral wall of the female rail along the transverse direction of the case;
- the vertical lateral wall of the female rail across from which the position sensor is located is arranged facing, along the transverse direction of the track, and directly by the second vertical lateral wall of the male rail, and opposite the first vertical lateral wall of the male rail in which the opening is arranged, along the transverse direction of the track;
- the case comprises a first part for attaching the case comprising an attachment system and a second part for receiving the position sensor, positioned in the extension of the first upper attachment part along the transverse direction of the track, receiving the position sensor on the inside, where the attachment system of the first part for attaching the case provides the attachment of the case to the first vertical lateral wall of the male rail near the opening, and the opening is configured in order to receive the first attachment part and the second part for receiving the position sensor of the case through the opening by sliding along the transverse direction of the track;

the second part for receiving the position sensor is located bearing against an inner surface of the second vertical lateral wall of the male rail, such that the position sensor is located closest to the vertical lateral wall of the female rail along the transverse direction of the case;

the upper part, respectively the first part, for attaching the case comprises a receiving housing configured for receiving and holding in position a connection interface connected to one or more cables, in particular electrical, arranged for being connected to the position sensor, where the receiving housing extends substantially along the transverse direction of the track in the upper part, respectively the first part, for attaching the case, and has an opening end positioned near the opening arranged in the first vertical lateral wall of the male rail, where the receiving housing opens out towards the outside of the male wheel near the opening end of the receiving housing;

the attachment system comprises:

two attachment tabs secured with the upper part, respectively the first part, for attaching the case, positioned on either side of the opening end of the receiving housing along the longitudinal direction of the track, and coming to bear against an outer surface of the first vertical lateral wall of the male rail, on both sides of the opening, along the longitudinal direction of the track; and two counter-bearing surfaces, substantially flat, secured to the upper part, respectively the first part, for attaching the case, positioned on either side of the opening end of the receiving housing along the longitudinal direction of the track, and coming to bear against an inner surface of the first vertical lateral wall of the male rail, on either side of the opening, along the longitudinal direction of the track, and each positioned substantially across from an attachment tab along the transverse direction of the slider, such that the first vertical lateral wall of the male rail is sandwiched between each attachment tab/counter-bearing surface pair located across from each other along the transverse direction of the track;

the attachment system comprises:

two elastic connections each connecting one attachment tab to the upper part, respectively the first part, for attaching the case, each configured so as to allow the movement of each attachment tab relative to the housing for receiving the case generally along the longitudinal direction of the slider;

two elastic connections each connecting one counter-bearing surface to the upper part, respectively the first part, for attaching the case, each configured so as to allow the movement of each counter-bearing surface relative to the housing for receiving the case generally along the longitudinal direction of the track, such that each attachment tab, and possibly each counter-bearing surface, is located positioned, at least in part, inside the housing for receiving the case without extending beyond the opening arranged on the first vertical lateral wall of the male rail along the longitudinal direction of the track, in order to allow insertion and sliding of the case through the opening arranged in the first vertical lateral wall of the male rail along the transverse direction of the track, and then that each attachment tab and each counter-bearing surface may move, because of the elasticity of each elastic connection, relative to the upper part, respectively the first part, for attaching the case, generally along the longitudinal direction of the track in order to be deployed outside the housing for receiving the case and that the attachment tabs and the counter-bearing surfaces are positioned on either side of the opening end of the receiving housing along the longitudinal direction of the track, in order that the first lateral wall of the male track is sandwiched between each attachment tab/counter-bearing surface pair located facing along the transverse direction of the track with each attachment tab coming to bear against the outer surface of the first vertical lateral wall of the male rail and each counter-bearing surface coming to bear against the inner surface of the first vertical lateral wall of the male rail, in order to provide the attachment of the case to the male rail;

the case is made of a single unit, advantageously of plastic, such as for example polyoxymethylene (POM);

the case is attached to the male rail by extending completely in the volume of the female rail along the transverse direction of the track.

The disclosure also relates to a manufacturing process for a track according to one of the embodiments of the disclosure comprising:

a) inserting the case for the position sensor through the opening arranged on the substantially flat wall of the male rail;

b) sliding the case relative to the male rail through the opening arranged on the substantially flat wall of the male rail such that the case extends at least partially into the volume of the male rail with the position sensor across from the substantially flat wall of the female rail;

c) attaching the case to the male rail.

According to an embodiment of the process:

during steps a) and b), each attachment tab and each counter-bearing surface is positioned, at least in part, inside the housing for receiving the case without extending beyond the opening arranged on the first vertical lateral wall of the male rail along the longitudinal direction of the track; and during step c), the attachment tabs and the counter-bearing walls are deployed outside of the housing for receiving the case such that the attachment tabs and the counter-bearing surfaces are positioned on either side of the opening end of the receiving housing along the longitudinal direction of the track, in order that the first vertical lateral wall of the male rail is sandwiched between each attachment tab/counter-bearing surface pair located across from it along the transverse direction of the track with each attachment tab coming to bear against the outer surface of the first vertical lateral wall of the male rail and each counter-bearing surface coming to rest against the inner surface of the first vertical lateral wall of the male rail, from both sides of the opening, along the longitudinal direction of the track, in order to provide the attachment of the case to the male rail.

The disclosure finally relates to a vehicle seat comprising a track according to one of the embodiments of the disclosure.

The invention claimed is:

1. A track for a vehicle seat comprising:
a female rail, having at least one substantially flat wall;
a male rail, also having at least one substantially flat wall, mounted sliding relative to the female rail along a longitudinal direction of the track, where the female rail comes to surround the male rail along a transverse direction of the track, with the substantially flat wall of the female rail located across from the substantially flat wall of the male rail; and a position sensor configured so as to determine the position of the male rail relative to the female rail, at least along the longitudinal direction of the track, where the position sensor is received inside a case, wherein the case is fixed to the male rail and at least partially extending into a volume of the male rail, such that the position sensor is located across from the substantially flat wall of the female rail, after having been inserted and slid through at least one opening arranged in the substantially flat wall of the male rail, and such that the at least one opening positions the case in the at least one opening in the substantially flat wall of the male rail, and wherein the case comprises a first part for attaching the case comprising an attachment system and a second part for receiving the position sensor inside, positioned in an extension of the first part.

2. The track of claim 1 wherein:

the substantially flat wall of the male rail in which the opening is arranged is a first vertical lateral wall of the male rail, substantially extending along the longitudinal direction and along a vertical direction of the track, and wherein the case is fixed to the male rail after having been inserted and slid through the opening substantially along the transverse direction of the track, where the male rail has a second vertical lateral wall, substantially parallel to the first vertical lateral wall;

the substantially flat wall of the female rail across from which the position sensor is located is a vertical lateral wall of the female rail, which extends substantially along the longitudinal direction and along the vertical direction of the track, substantially parallel to the first vertical lateral wall and the second vertical lateral wall of the male rail, where the position sensor is located across from the vertical lateral wall of the female rail along the transverse direction of the track.

3. The track of claim 2 wherein the vertical lateral wall of the female rail across from which the position sensor is located is arranged facing, along the transverse direction of the track, and adjacent to the first vertical lateral wall of the male rail in which the opening is arranged, and opposite the second vertical lateral wall of the male rail, along the transverse direction of the track.

4. The track of claim 3 wherein the case and the opening are configured such that the position sensor extends, at least partially, through the opening.

5. The track of claim 4 wherein:

the case comprises an upper attachment part comprising an attachment system and a lower part for receiving the position sensor inside, positioned under the upper attachment part along the vertical direction of the track;

the opening comprises an upper part configured for receiving the upper attachment part for attaching the case through the upper part of the opening by sliding the case along the transverse direction of the track, and advantageously for preventing the sliding of the lower part of the case along the transverse direction of the track by way of the attachment of the upper part of the case to the upper part of the opening, where the attachment system for attaching the case provides the attachment of the case to the first vertical lateral wall of the male rail near the upper part of the opening;

the opening comprises a lower part, positioned under the upper part of the opening along the vertical direction of a slider, and configured for receiving the lower part of the case through the lower part of the opening by sliding the case along the transverse direction of the track.

6. The track of claim 5 wherein the lower part for receiving the position sensor is located joined against an inner surface of the vertical lateral wall of the female rail along the transverse direction of the track, such that the position sensor is located closest to the vertical lateral wall of the female rail along the transverse direction of the case.

7. The track of claim 2 wherein the vertical lateral wall of the female rail across from which the position sensor is located is arranged facing, along the transverse direction of the track, and directly by the second vertical lateral wall of the male rail, and opposite the first vertical lateral wall of the male rail in which the opening is arranged, along the transverse direction of the track.

8. The track of claim 7 wherein:

the attachment system of the first part for attaching the case provides the attachment of the case to the first vertical lateral wall of the male rail near the opening;

the opening is configured in order to receive the first part and the second part for receiving the position sensor of the case through the opening by sliding along the transverse direction of the track.

9. The track of claim 8 wherein the second part for receiving the position sensor is located bearing against an inner surface of the second vertical lateral wall of the male rail, such that the position sensor is located closest to the vertical lateral wall of the female rail along the transverse direction of the case.

10. The track of claim 8, wherein the first part for attaching the case comprises a receiving housing configured for receiving and holding in position a connection interface connected to one or more cables, in particular electrical, arranged for being connected to the position sensor, where the receiving housing extends substantially along the transverse direction of the track in the first part, of the case, and has an opening end positioned near the opening arranged on the first vertical lateral wall of the male rail, where the receiving housing opens out towards an outside of the male rail near the opening end of the receiving housing.

11. The track of claim 10 wherein the attachment system comprises:

two attachment tabs secured with the first part, for attaching the case, positioned on either side of the opening end of the receiving housing along the longitudinal direction of the track, and coming to bear against an outer surface of the first vertical lateral wall of the male rail, on both sides of the opening along the longitudinal direction of the track; and two counter-bearing surfaces, substantially flat, secured to the first part, of the case for attaching, positioned on either side of the opening end of the receiving housing along the longitudinal direction of the track, and coming to bear against an inner surface of the first vertical lateral wall of the male rail, on either side of the opening, along the longitudinal direction of the track, and each counter-bearing surface positioned substantially across from an attachment tab along the transverse direction of a slider, such that the first vertical lateral wall of the male rail is sandwiched between each attachment tab/counter-bearing surface pair located across from along the transverse direction of the track.

12. The track of claim 11 wherein the attachment system comprises:

two elastic connections each connecting one attachment tab to the first part, for attaching the case, each configured so as to allow movement of each attachment tab relative to the housing for receiving the case generally along the longitudinal direction of the slider;

two elastic connections each connecting one counter-bearing surface to the first part, for attaching the case, each configured so as to allow movement of each counter-bearing surface relative to the housing for receiving the case generally along the longitudinal direction of the slider;

wherein each attachment tab is positioned, at least in part, inside the housing for receiving the case without extending beyond the opening arranged on the first vertical lateral wall of the male rail along the longitudinal direction of the track, in order to allow insertion and sliding of the case through the opening arranged in the first vertical lateral wall of the male rail along the transverse direction of the track;

because each attachment tab and each counter-bearing surface may move, because of the elasticity of each elastic connection, relative to the first part, of the case for attaching, generally along the longitudinal direction of the track in order to be deployed outside the receiving housing of the case and that the attachment tabs and the counter-bearing surfaces are positioned on either side of the opening end of the receiving housing along the longitudinal direction of the track in order that the first lateral wall of the male track is sandwiched between each attachment tab/counter-bearing surface pair located facing along the transverse direction of the track with each attachment tab coming to bear against the outer surface of the first vertical lateral wall of the male rail and each counter-bearing surface coming to bear against the inner surface of the first vertical lateral wall of the male rail, in order to provide the attachment of the case to the male rail.

13. The track of claim 1 wherein the case is made of a single unit, advantageously of plastic.

14. The track of claim 1 wherein the case is attached to the male rail by extending completely in a volume of the female rail along the transverse direction of the track.

15. A process for manufacturing the track according to claim 1 comprising:
a) inserting the case for the position sensor through the opening arranged on the substantially flat wall of the male rail;
b) sliding the case relative to the male rail through the opening arranged on the substantially flat wall of the male rail such that the case extends at least partially into the volume of the male rail with the position sensor across from the substantially flat wall of the female rail;
c) attaching the case to the male rail.

16. A process for manufacturing the track according to claim 12 comprising:
a) inserting the case for the position sensor through the opening arranged on the substantially flat wall of the male rail;
b) sliding the case relative to the male rail through the opening arranged on the substantially flat wall of the male rail such that the case extends at least partially into the volume of the male rail with the position sensor across from the substantially flat wall of the female rail;
c) attaching the case to the male rail;
wherein:
during steps a) and b), each attachment tab and each counter-bearing surface is positioned, at least in part, inside the housing for receiving the case without extending beyond the opening arranged on the first vertical lateral wall of the male rail along the longitudinal direction of the track; and
during step c), the attachment tabs and the counter-bearing walls are deployed outside of the receiving housing for the case such that the attachment tabs and the counter-bearing surfaces are positioned on either side of the opening end of the receiving housing (54) along the longitudinal direction of the track, in order that the first vertical lateral wall of the male rail is sandwiched between each attachment tab/counter-bearing surface pair located across from it along the transverse direction of the track with each attachment tab coming to bear against the outer surface of the first vertical lateral wall of the male rail and each counter-bearing surface coming to rest against the inner surface of the first vertical lateral wall of the male rail, from both sides of the opening, along the longitudinal direction of the track, in order to provide the attachment of the case to the male rail.

17. A vehicle seat comprising the track according to claim 1.

* * * * *